(12) United States Patent
Van der Steen

(10) Patent No.: US 7,357,655 B1
(45) Date of Patent: Apr. 15, 2008

(54) ELECTRICAL CARD CONNECTOR

(75) Inventor: Hendrikus P. G. Van der Steen, Den Dungen (NL)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/647,945

(22) Filed: Dec. 28, 2006

(51) Int. Cl.
*H01R 29/00* (2006.01)

(52) U.S. Cl. .................. 439/188; 439/630; 439/328

(58) Field of Classification Search ............... 439/489, 439/188, 630, 607, 328, 64
See application file for complete search history.

(56) References Cited

U.S. PATENT DOCUMENTS

| | | | |
|---|---|---|---|
| 5,427,534 A * | 6/1995 | Spickler et al. ............ 439/64 |
| 6,398,567 B1 * | 6/2002 | Nishimura ................. 439/159 |
| 6,773,280 B2 * | 8/2004 | Sasaki et al. .............. 439/159 |
| 2004/0192096 A1 * | 9/2004 | Sato et al. ................. 439/188 |
| 2004/0203272 A1 * | 10/2004 | Chia-Chen ................. 439/188 |
| 2005/0014405 A1 * | 1/2005 | Chen ......................... 439/188 |
| 2006/0234539 A1 * | 10/2006 | Zhao ......................... 439/188 |

* cited by examiner

*Primary Examiner*—Hien Vu
(74) *Attorney, Agent, or Firm*—Wei Te Chung

(57) ABSTRACT

A card connector comprises a housing having a receptacle section for receiving a card therein and a slider section, the slider section defining a leading member; a plurality of contacts received in the receptacle section; a slider engaging with the card which is provided to swing in the slider section in a direction of substantially parallel to an insertion direction and; a spring received in the slider section for engaging with a lower end of the slider; a rotator engaging with the slider for guiding the slider; a elastic plate receiving an end of the slider section for engaging with the rotator to leading the slider; and a cover mounted on the housing.

15 Claims, 10 Drawing Sheets

ELECTRICAL CARD CONNECTOR

BACKGROUND OF THE INVENTION

1. Field of the Invention

The present invention relates to an electronic card connector, and particularly relates to an electronic card for accommodating an electronic card, and a slider which leads the electronic card sliding on the housing.

2. Background of the Invention

Small electronic cards with a large memory are nowadays regularly used with many kinds of portable electrical products, for example, cell phones, digital cameras and PDAs. The electrical product has a PCB and an electrical card connector fixed on the PCB for accommodating an electronic card and electrically connecting it to the conductive terminals of the electronic card. The electrical card connector further includes an ejector for ejecting the electronic card that is accommodated in the electrical card connector. Because the electronic card is frequently inserted and ejected from the electrical card connector, the electrical card connector must be durable enough to ensure the smooth insertion and ejection of the electronic card from the electrical card connector so no damage is caused, thus avoiding the situation where the electrical card connector fails to connect with the electronic card. Hence the conductive terminals of the electrical card connector and the electronic card are electrically connected to each other.

Referring to FIG. 1, the electrical card connector of the prior art is used to accommodate an electronic card (not shown), comprising an insulative housing 6, a conductive terminal 7, an ejector 8 and a shield casing 9. The insulative housing 6 has a base portion 60, a first sidewall 61 and a second sidewall 62. The first sidewall 61 and the second sidewall 62 are connected parallel to two sides of the base portion 60. The insulative housing 1 further includes an insertion space 63. The conductive terminal 7 is arranged on the base portion 60 of the isolative housing 6. The ejector 8 has a sliding element 80, an elastic element 81, a guiding element 82 and a track groove 83. The track groove 83 is formed on the first sidewall 61 and adjacent to the base portion 60. The sliding element 80 has a sliding portion 801 disposed slidably on the first sidewall 61 and a pushed sidewall 802 inserted into the insertion space 63. The elastic element 81 is installed between the first sidewall 61 and the sliding element 80. One side of the guiding element 82 is a pivot side 821 and the other side of the guiding element 82 is a guiding side 822. The pivot side 821 is connected pivotally to the sliding portion 801 of the sliding element 80, and the guiding side 822 is received movably in the track groove 83. The shield casing 9 covers the insulative housing 6 for clamping the sliding portion 801 between the first sidewall 61 and shield casing 9.

When the electronic card is inserted into the insertion space 63, one side of the electronic card pushes the pushed sidewall 802 of the sliding element 80 and the elastic element 81 extends to move the guiding side 822 of the guiding element 82. It is thereby positioned in the track groove 83 completing the inserting action. When the electronic card is pushed again, the guiding side 822 of the guiding element 82 is released from the track groove 83 and the elastic element 80 pulls the sliding element 80 back for the push sidewall 802 which ejects the electronic card from the electrical card connector to complete the ejecting action. Because the sliding portion 801 of the sliding element 80 is only clamped between the first sidewall 61 and the shield casing 9, the sliding element 80 is easily swung and rubbed. As such, the electronic card cannot be smoothly inserted into or ejected from the electrical card connector, causing damage to the electrical connection between the electronic card and the conductive terminal 7.

With the employment of unique considerations and application of theories, and based on several years experience in specialized production of all flexible assembly systems and mechanisms, the inventor has come up with an innovative electrical card connector.

SUMMARY OF THE INVENTION

An object, therefore, of the invention is to provide a new and improved card connector able to prevent a card received therein flying out.

Another object of the invention is to provide a new and improved card connector able to prevent data stored therein from loosing with card removal.

In the exemplary embodiment of the invention, In order to achieve the above objectives, the present invention provides an electrical card connector, comprising an insulative housing, a plurality conductive terminals, a slider for guiding the card insertion, a spring received in the housing for engaging with slider, a rotator for guiding the slider sliding in the housing, and an elastic plate for engaging with the rotator, a detecting contact received in the housing. By the engagement or disengagement between the detecting contact and the cover contact, The card switch that will switch off the memory system of the mobile phone before the contact between the card reader contacts and the card contact pads is broken. Using the rotator engaging with slider and the slider engaging with the card, The advantage of this method is that you can not loose data with card removal. Another feature they want to have is card fly-out protection. At the moment that the memory card is suddenly released the card will not "pop out". The stopper provides card fly-out protection and when the card switch has a switch point just before the memory card touches the stopper the stopper will provide also the time delay function.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 7 is isometric perspective view of the slider of the card connector shown in FIG. 1;

DETAILED DESCRIPTION OF THE PREFERRED EMBODIMENT

Figure 1:
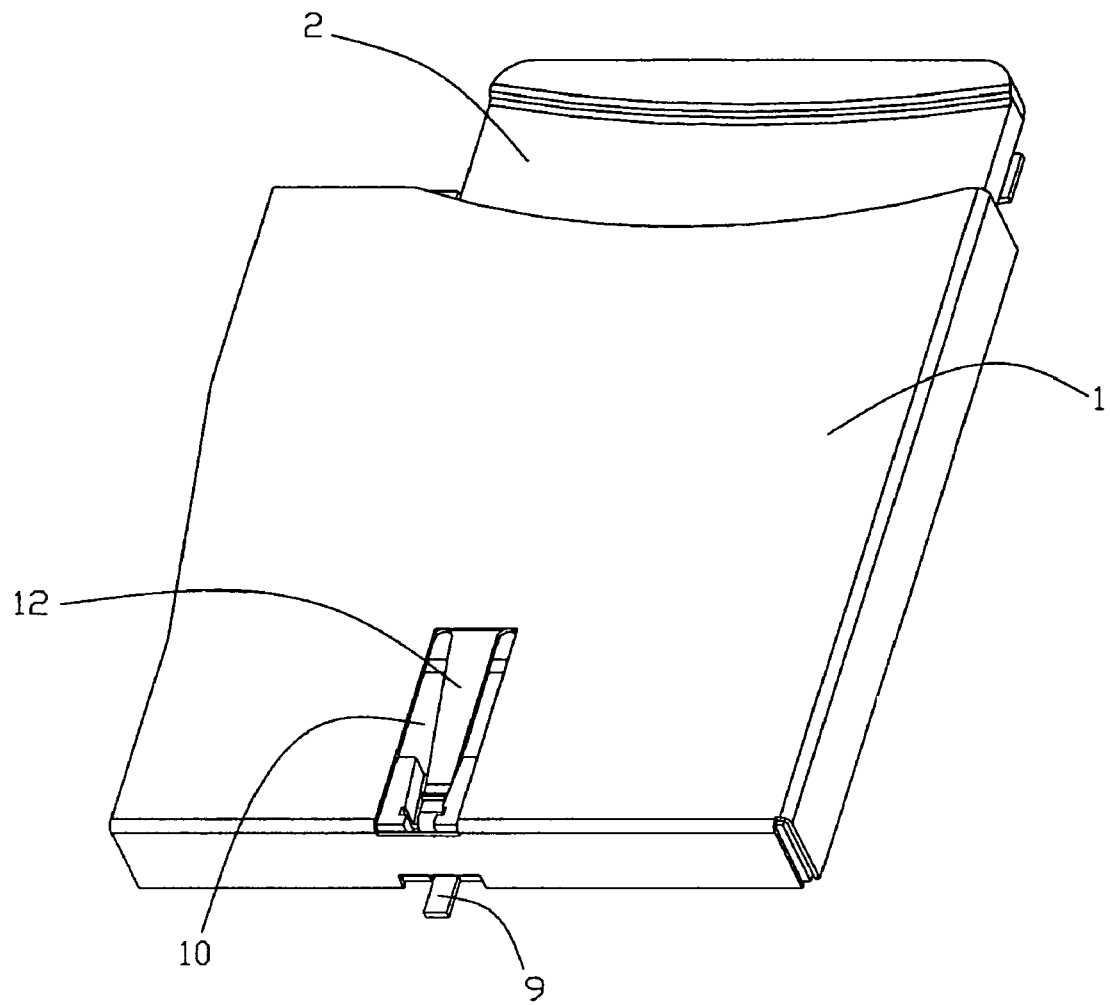
FIG. 1 is a perspective view of a card connection in corresponding of a preferred embodiment of the invention.
Figure 2:
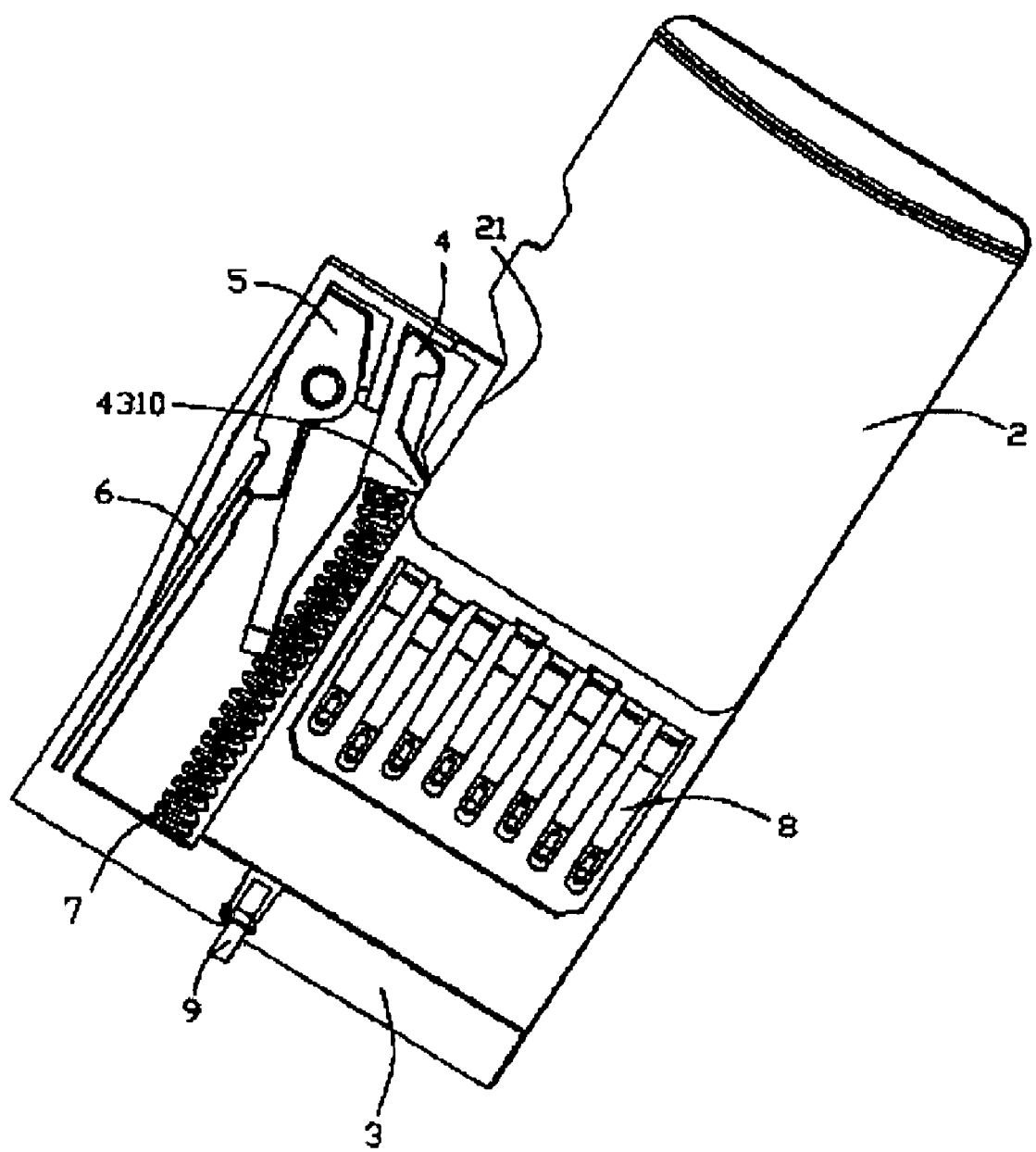
FIG. 2 is an isometric perspective view of the card connector shown in FIG. 1 when the card is to be inserted into the connector, wherein the cover is taken.
Figure 3:
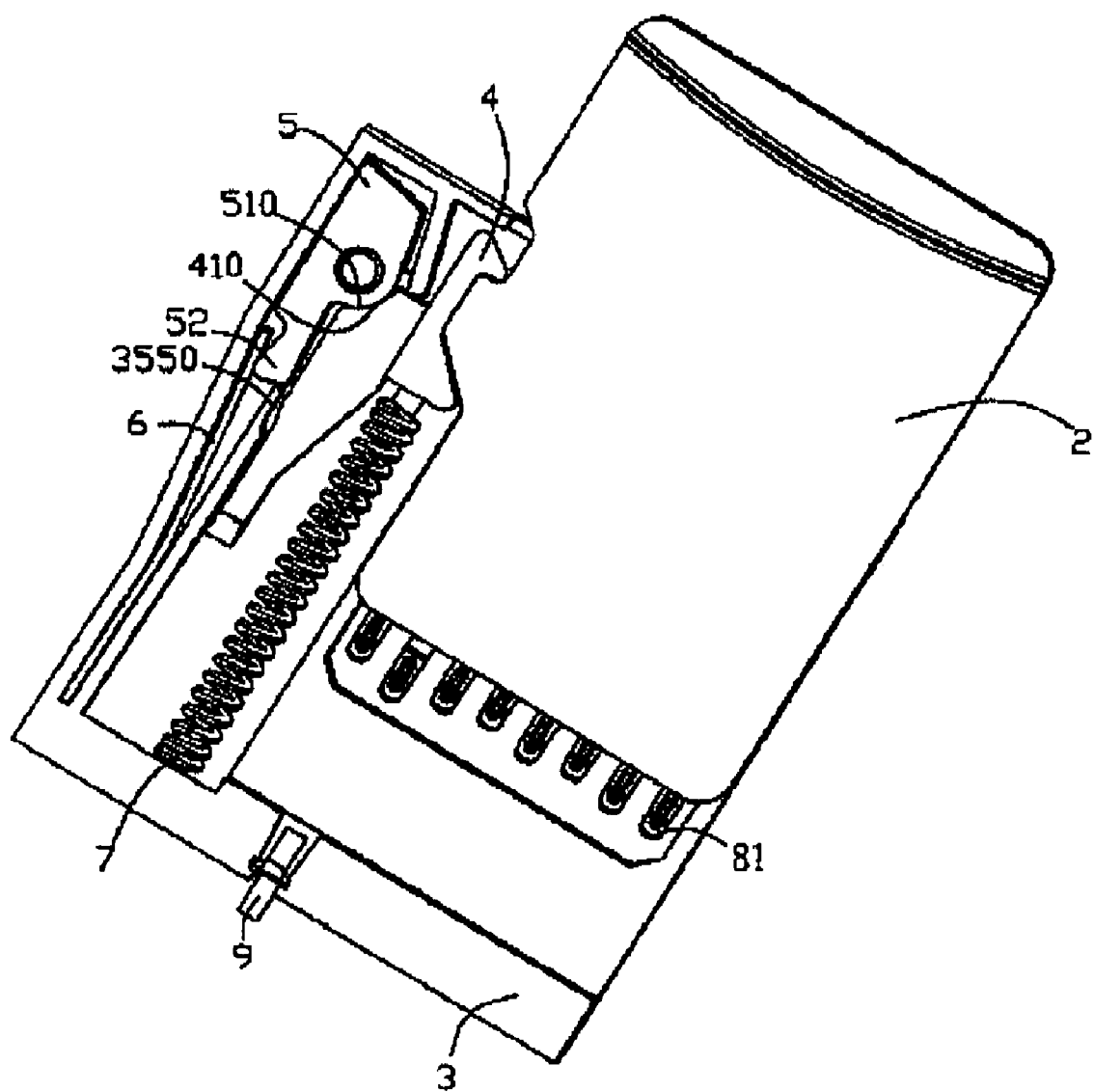
FIG. 3 is another isometric perspective view of the card connector shown in FIG. 1 when the card has been partially inserted into the connector, wherein the cover is taken.
Figure 4:
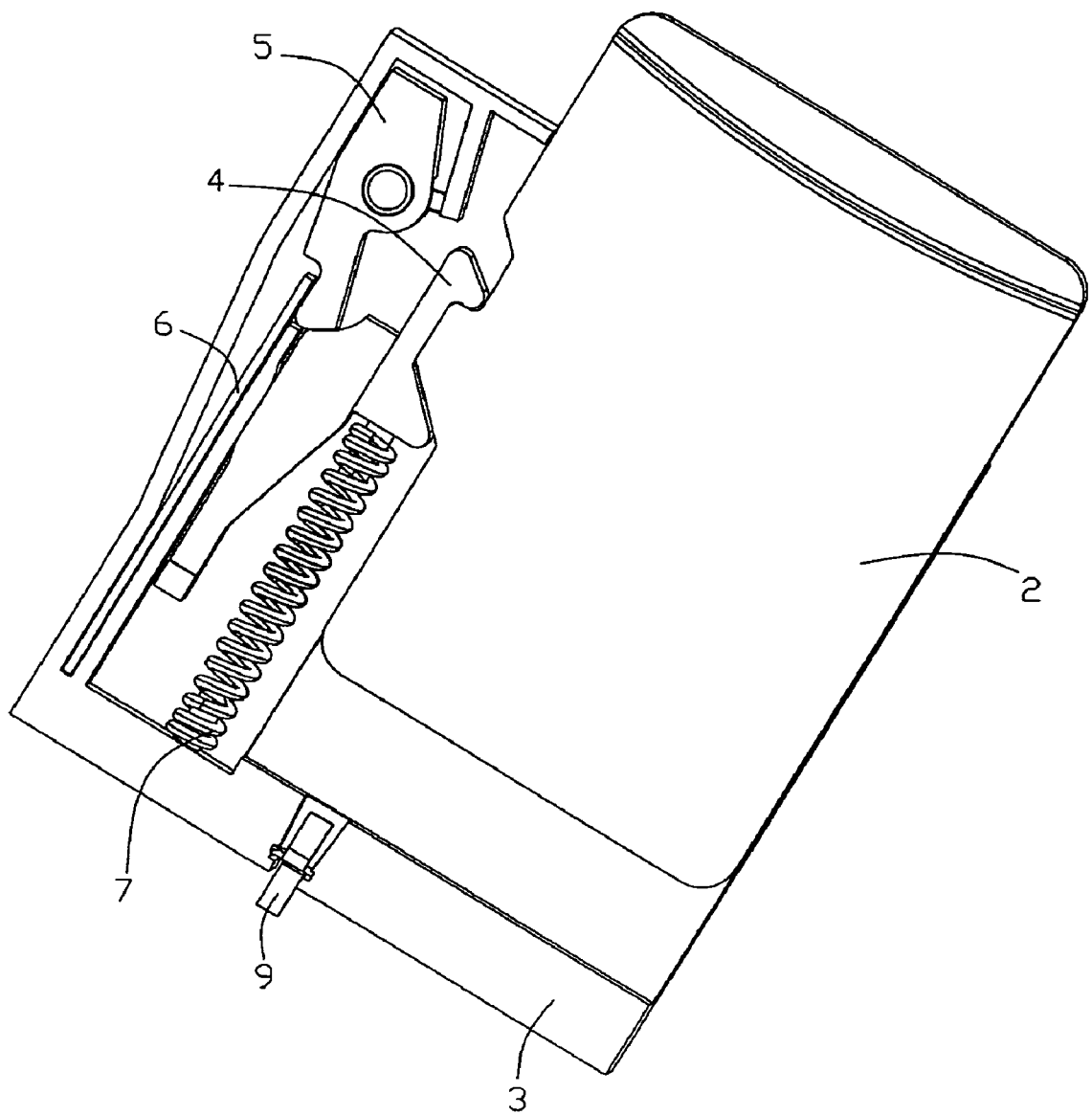
FIG. 4 is another isometric perspective view of the card connector shown in FIG. 1 when the card has been partially inserted into the connector and the arcuately portion of the slider engages with the curved portion of the rotator, wherein the cover is taken.
Figure 5:
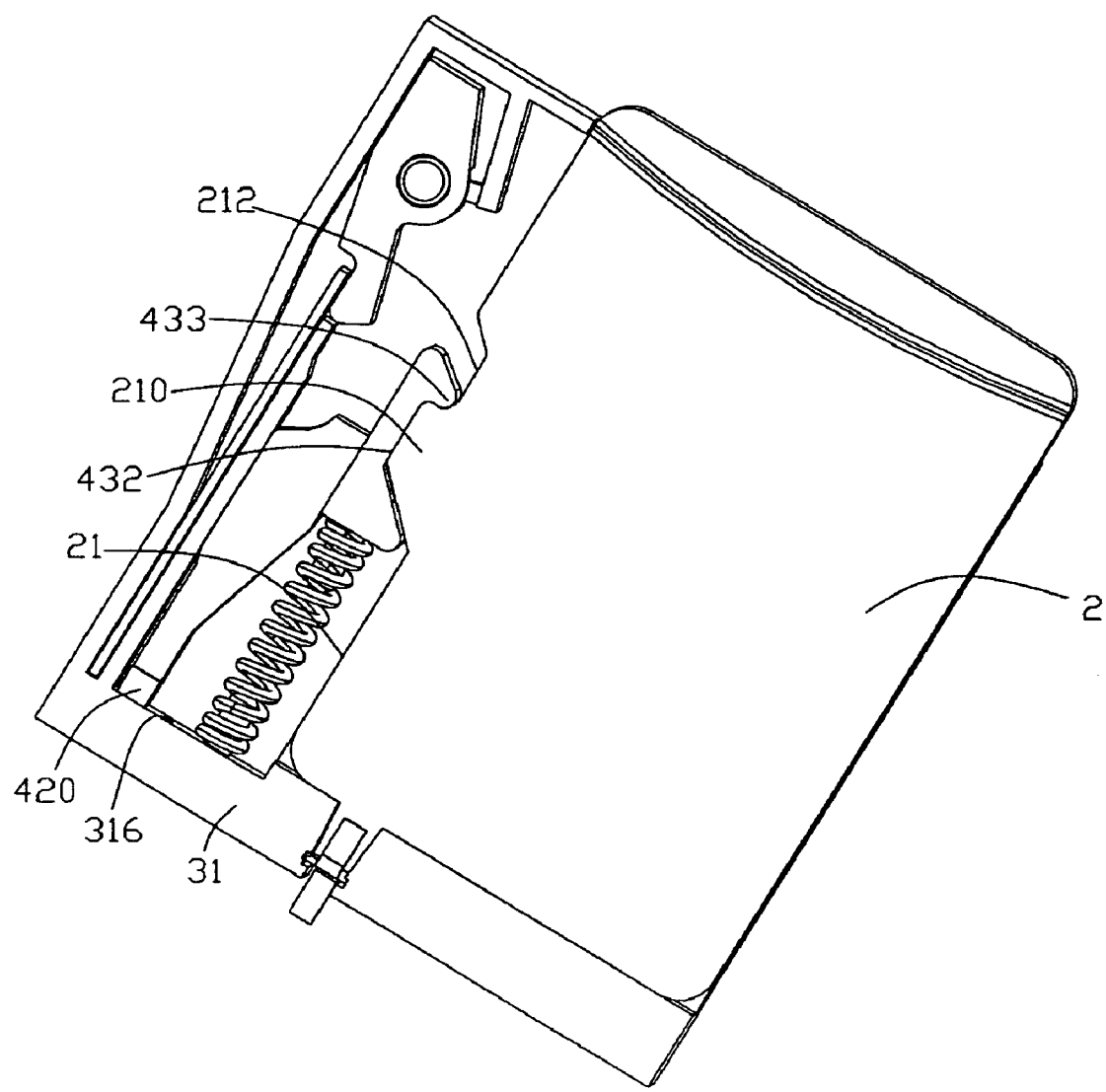
FIG. 5 is another isometric perspective view of the card connector shown in FIG. 1 when the card has been partially inserted into the connector and the arcuately portion of the slider engages with the tail portion of the rotator, wherein the cover is taken.
Figure 6:
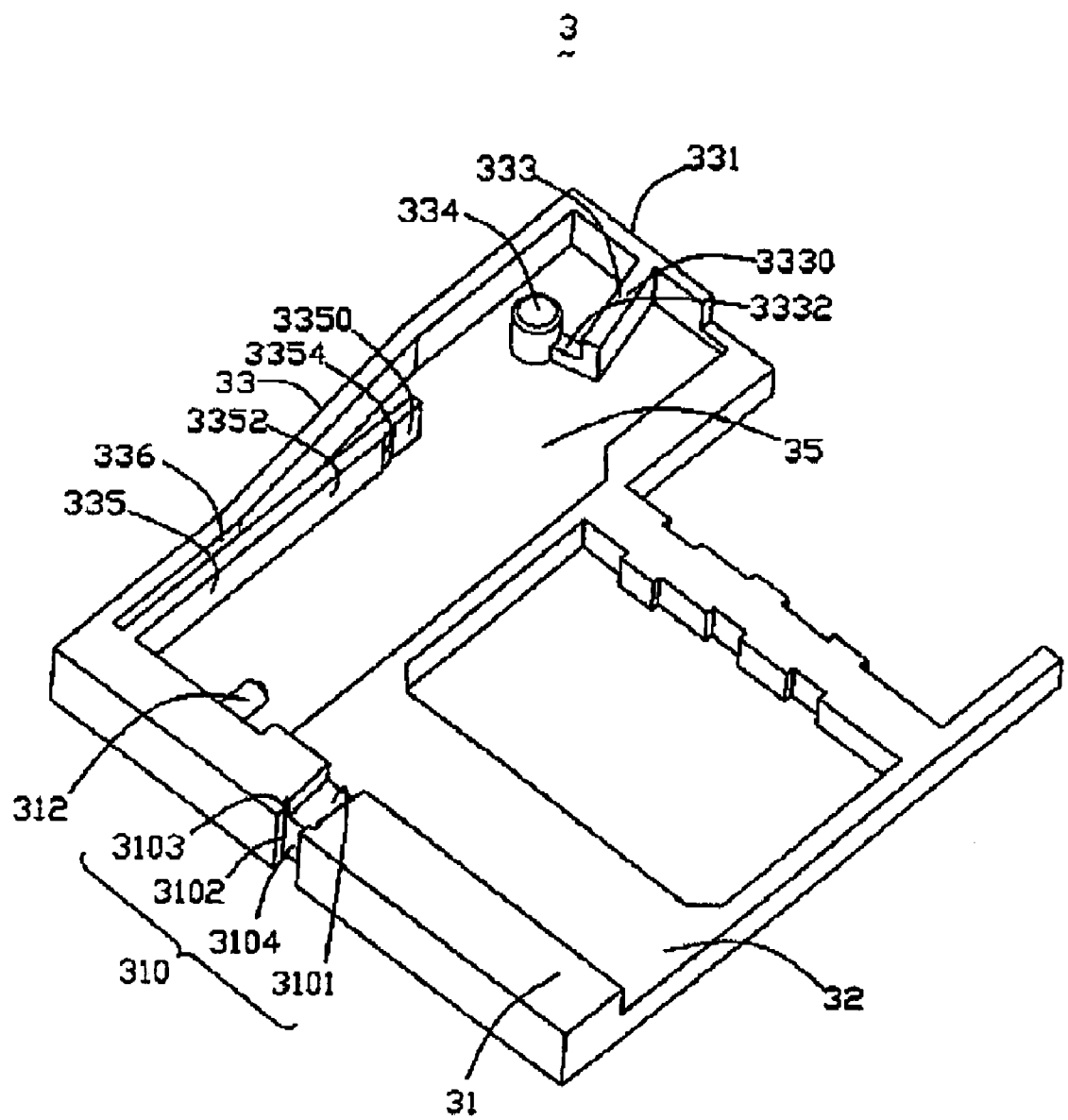
FIG. 6 is isometric perspective view of the housing of the card connector shown in FIG. 1.
Figure 7:
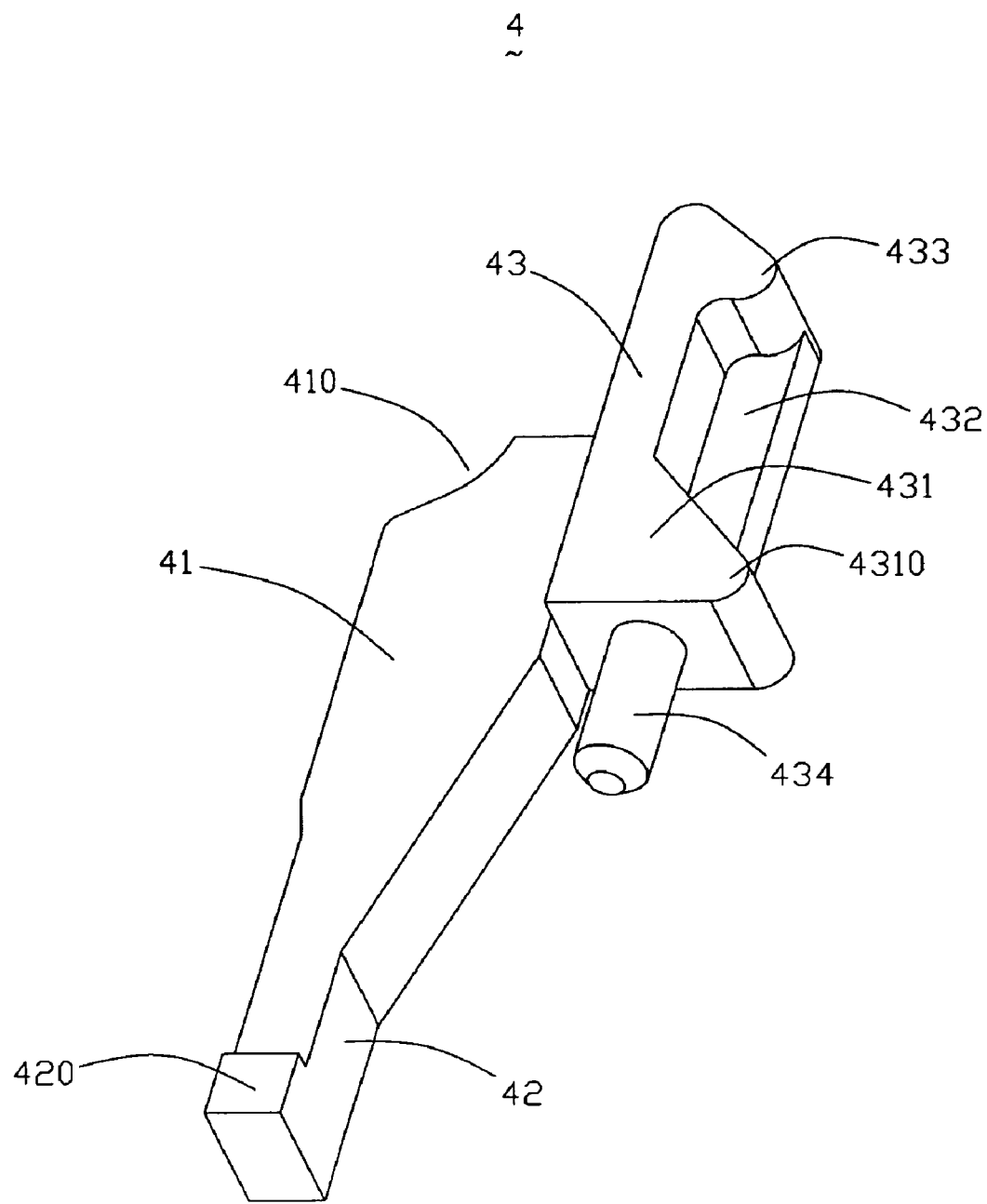
FIG. 7 is isometric perspective view of the housing of the card connector shown in FIG. 1.
Figure 8:
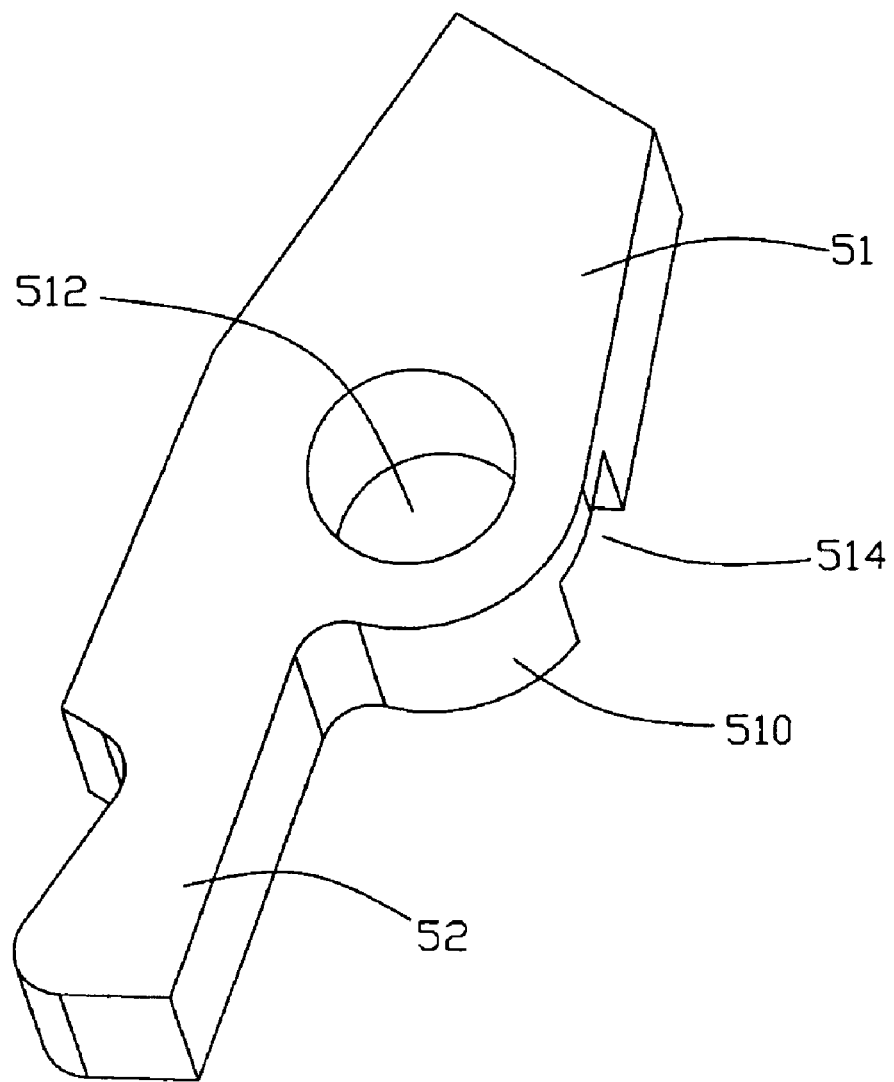
FIG. 8 is isometric perspective view of the rotator of the card connector shown in FIG. 1.
Figure 9:
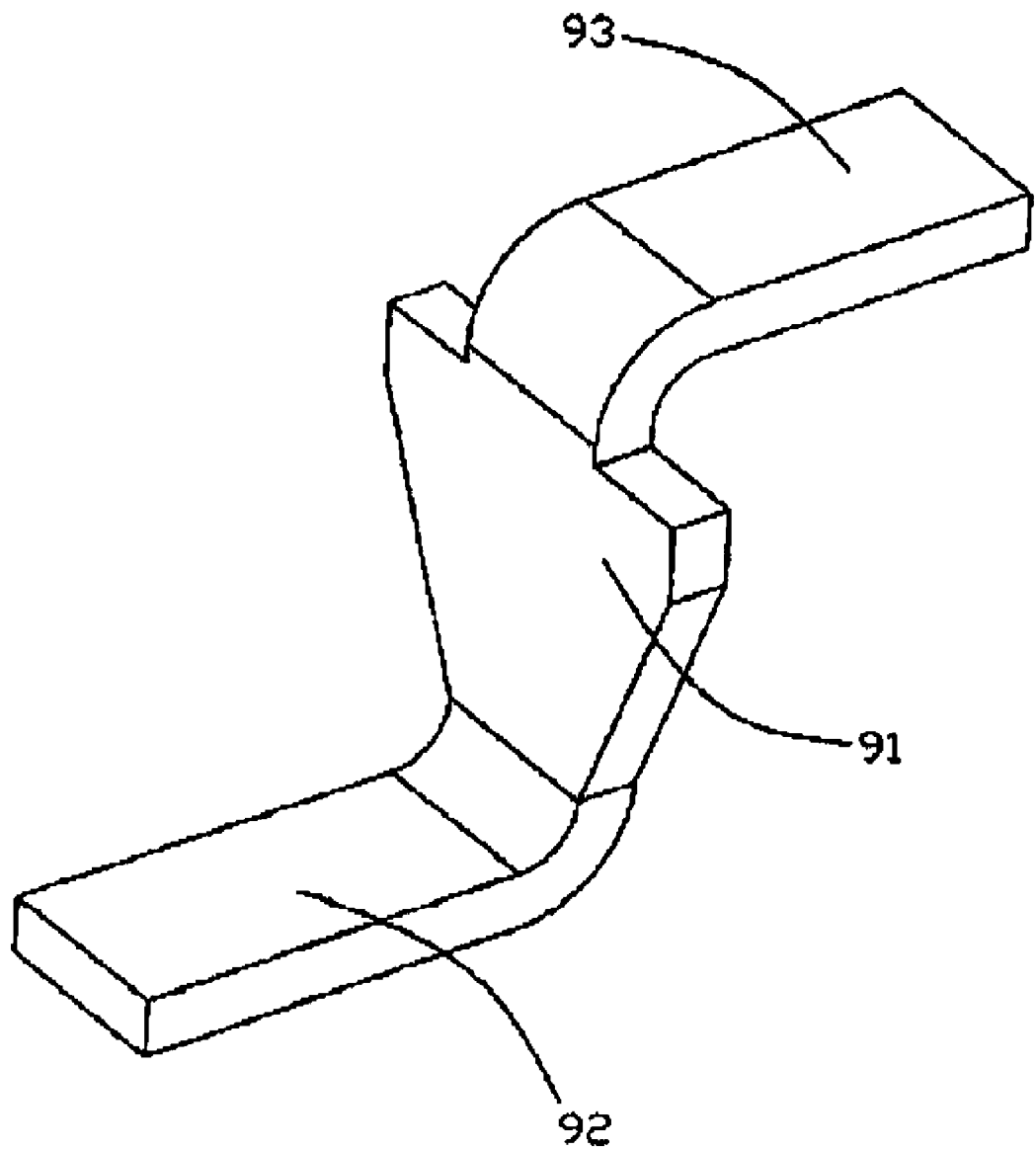
FIG. 9 is isometric perspective view of the detecting contact of the card connector shown in FIG. 1.
Figure 10:
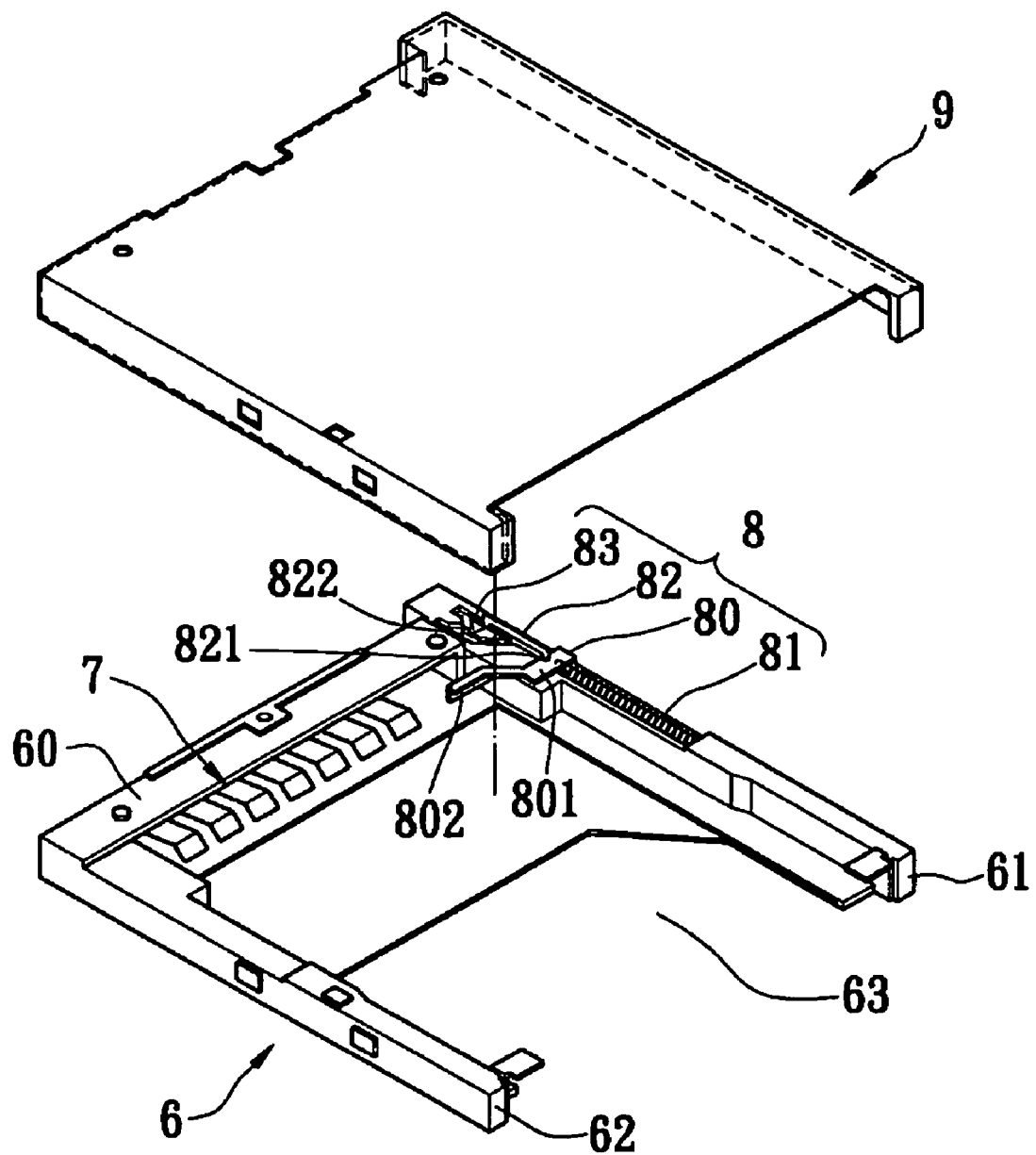
FIG. 10 is isometric perspective view of a related card connector.

Referring to FIGS. 1 and 9, the present invention provides an electrical card connector for receiving an electronic card 2. The electrical card connector includes an insulative housing 3, a plurality of conductive terminals 8, a slider 4 for guiding the card insertion, a first spring member 7 received in the housing 3 for engaging with slider, a rotator 5 for guiding the slider 4 sliding in the housing 3, and an elastic plate or second spring member 6 for engaging with the rotator 5, a detecting contact 9 received in the housing 3 and a cover 1 mounted on the housing 3.

The card 2 is made of rectangular shape and comprises an engaging side 21 with a projection 210 and an opening 212 for engaging with the slider 4.

The insulative housing 3 has a front wall 31 and a rear wall 31, a sidewall 343, and a body portion (not labeled) comprising a card receiving section 32 for receiving the card 2 therein and a ejecting mechanism receiving section 35. The front wall 31 further extends a locating plate 335 for leading the slider 4 sliding in the sliding section 35 and a locating pin 312 for engaging with spring 7 for locating an end of the spring 7 therein from a side of the front wall. The locating plate 335 defines a base portion 3352 and a head 3350 connecting the base portion 3352 with a slant surface 3354 for facilitating the slider 4 sliding thereon. An elongate channel 336 is formed between the sidewall 33 and the locating plate 312 for receiving the spring plate 6 therein. The sliding section 35 further defines a locating post 334 for locating the rotator 5 thereon and a stopper wall 333 as high as the front and rear sidewalls 31, 331 for engaging with the slider 4 with a first end 3332 of the stopper wall 333 connecting with the locating post 334 and a second end 3330 of the stopper wall 333 connecting with the rear wall 331. The first end 3332 is lower than the second end 3330 of the stopper wall 333 so as to locate the rotator 5. In addition, the housing further comprises a recess 310 disposed on the front wall 31 adjacent to the receiving section 32 for receiving the protecting contact 9 therein. The recess 310 defines a horizontal recess 3101 for receiving the contact portion 93 of the detecting contact 9 and a vertical recess 3104 for receiving the tail portion 92 of the detecting contact 9. The vertical recess 3104 formed in a rear end of the body portion comprises an inner recess 3103 used for receiving the retention portion 91 of the detecting contact 9 and an outer recess 3102 used for receiving the tail portion 92 of the detecting contact 9 and the inner recess 3103 is wider than the outer recess 3102.

The conductive terminal 8 is arranged on the base portion 10 of the insulative housing 1. The conductive terminal 8 has a soldering side (not labeled) and a contacting side 81 formed at two sides thereof. The soldering side is disposed at an outside of the receiving section 32, and the contacting side 81 is disposed at an inside of the receptacle section 32.

The slider 4 includes a first section 43 engageable with a inserted card, and a second portion connected to the first portion. The first section has a base 41, a supporting portion 42 extending from a lower end of the base 41. The supporting portion 42 and first section 43 are both higher than the base 41 for supporting the cover 1 thereon. First section 43 comprises a positioning pole 434 for locating the spring 7 and a hook portion 433 formed at top end of the slider 4 for engaging with the card 2 and a concave 432 bellow the hook portion 433 for receiving the projection 210 of the card 2. In addition, the supporting portion 42 is disposed with a length for contacting with the bottom side of the body portion, when the card 2 is abutting against the front wall 31.

The rotator 5 biased by a second spring member and disposed within the ejecting mechanism receiving section and comprises a body 51 with a locating hole 512 therein, a stopper connecting with the second section of the slider. The stopper has a curved portion 510 for engaging with the arcuately surface of the slider 4, a tail portion 52 with a for abutting against the elastic plate 6 from a bottom side thereof. The rotator 5 further defines a concave 514 formed on a bottom surface of the body 51 and communicating with the locating hole 512 for receiving the locating end therein.

The cover 1 is covered on the insulative housing 3, and engages with housing 3 for cooperatively forming a receiving room to receive the card 2 therein, a channel for facilitating the card being inserted, a window 10 and a cover contact 12 extending from a side of the window 10 towards the body portion for contacting with protecting contact 9.

The electrical card connector further includes a detecting terminal 9 arranged on the front wall 31 of the insulative housing 3 for detecting the electronic card 2 which may be electrically connected to the conductive terminals 8. The detecting terminal 9 comprises a retention portion 91, and a contact portion 93 and a tail portion 92 extending from two opposite ends of the retention portion 91. That is when the card 2 is inserted into the housing 3 and constitutes an electrical connection with the contacts 8 the detecting contact 9 is engaged with the cover contact 12 for forming into an electrical circuit. When the card 2 is pushed outside, the engagement between the detecting contact 9 and the cover contact 12 is broken hence the card assembly can switch off the memory system of the outer appliance before the contact between the contacts 8 received in the housing 3 and the card 2 is broken.

When the card 2 inserted into the receiving section 32, the projection 210 of the card 2 is initially engaging with the concave 432 of the slider 4 with the opening 212 coupled with hook portion 433. When the card 2 is further pushed, the slider 4 actuate the rotator 5 rotatably around the locating post 334 and the elastic plate 6 is pressed by rotator 5 to move towards the sidewall 33. The spring 7 is pressed in the slider's sliding direction and the guiding member 5 is sliding along the first slot 4011 from the initial position. When the card 2 attached to the front wall 31, the card is totally inserted into the receiving section 32. That is to say, when the card 2 is inserted into the card receiving section 32, the second portion of the slide is distant from the stopper which is pushed and rotated by the second spring member 6 toward the card receiving space from its original position; when the card 2 is ejected, the second portion of the slider 41 firstly is slowed and stopped by the stopper interfered with the course of the slider 4; and when the card 2 is further ejected, the second portion of the slide 41 further pushes the stopper along with the rotor back to its original positions, thereby allowing the card 2 to be completely ejected.

When the card 2 is pushed outside, the slider 4 engages with card 2 and the spring 7 restore quickly with moving in company with the slider 4. With those structures, the card 2 is prevented from flying out from the connector and with the interferential engagement between the supporting member 335 and the side of the slider 4 and the slider 4 and the engagement between the rotator 5 and the slider 4 which delay the card 2 pushing speed and prevent the card 2 flying out quickly. So there is enough time to switch off the memory system of the mobile appliance before the contact of the contacts 8 with the card 2 is broken.

In assembly, the spring plate 6 is inserted into the space 336 between the sidewall 33 and the supporting member 335, then the rotator 5 is mounted on the housing 3, the locating pin 334 on the receiving section 350 is inserted into the receiving hole 512 of the rotator 5. And then the spring 6 is mounted on the receiving section 350 and one end of the spring 6 is engaging with the positioning pin 312 of extending from the front wall 31. Successively, the slider 5 is mounted on the housing 3 with the locating pin 434 inserted into the other end of the spring 7. Continued, the contacts 8 are inserted into the contact section 32 of the housing 3 and the detecting contact 9 is inserted into the receiving recess 310 of the front wall 31. At last, the cover 1 is covered on the housing 3 and then the card 2 is inserted into the receiving room cooperatively formed between the cover 1 and the housing 3.

Before the card 2 is inserted into the card connector, the spring 7 restores to the original state, the supporting portion 42 of the slider 4 is abutting against the first sidewall and the stopper wall. The curved surface of the slider is abutting against the arcuate surface of the rotator Referring to the FIG. 12. The supporting member is abutting against a bottom portion of the tail portion 52 of the rotator 5 and one side of the slider 4 is abutting against a side of the supporting member 335 for getting a leading.

When the card 2 is inserted into the housing 3, the hook portion 433 of the slider 4 is inserted into the concave 212 of the card 2, the projected portion 210 of the card 2 is engaged with the concave 433 of the slider 4 at the same time.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While preferred embodiment in accordance with the present invention have been shown and described, equivalent modifications and changes known to persons skilled in the art according to the spirit of the present invention are considered within the scope of the present invention as defined in the appended claims.

What is claimed is:

1. A card connector having two-stage ejecting mechanism, comprising:
   a housing having a substantial planar surface dividing into a card receiving section, and a ejecting mechanism receiving section;
   a cover attached to the housing from atop so as to jointly define a receiving space with the housing for receive a card therein;
   the ejecting mechanism including a slider biased by a first spring member which attaches to a locating pin in the housing and moveably arranged within the ejecting mechanism receiving section, the slider including a first section engageable with a inserted card, and a second portion connected to the first section;
   a rotator attached to a locating post and biased by a second spring and disposed within the ejecting mechanism receiving section and having a stopper in contact with the second section of the slider;
   wherein when the card is inserted into the card receiving section, the second portion of the slide is distant from the stopper which is pushed and rotated by the second spring member toward the card receiving space from its original position;
   wherein when the card is ejected, the second portion of the slider firstly is slowed and stopped by the stopper interfered with the course of the slider; and
   wherein when the card is further ejected, the second portion of the slide further pushes the stopper along with the rotor back to its original position, thereby allowing the card to be completely ejected;
   wherein the slider comprises a body portion, a supporting portion extending from a lower portion of the body portion for engaging with the locating plate and the hook portion disposed on a top end thereof;
   wherein height of the hook portion and the supporting portion is higher than the body portion.

2. The card connector as claimed in claim 1, further comprising a detecting contact, and the cover further defining a cover contact for engaging with detecting contact.

3. The card connector as claimed in claim 1, wherein the rotator comprises a base portion with a locating hole, a tail portion at a lower end base portion, a curved portion for engaging with the arcuately portion of the slider, and a concave formed on a bottom surface of the base portion and communicating with the locating hole.

4. The card connector as claimed in claim 3, wherein the locating post extending upwardly from the receiving section for engaging with the concave of the rotator.

5. The card connector as claimed in claim 4, wherein the housing has a front wall and a rear wall opposite to the front wall and the locating plate extends from the front wall of the housing.

6. The card connector as claimed in claim 5, wherein the housing further comprises a space cooperatively formed by the leading member and the sidewall of the housing.

7. The card connector as claimed in claim 6, wherein the housing further comprises a stopper wall with one end connecting the rear wall of the housing.

8. The card connector as claimed in claim 1, wherein the leading member comprises a body and a lead connecting the body with a slant surface.

9. The card connector as claimed in claim 1, wherein further comprising a detecting contact with a retention portion, a contact portion and a tail extending from two opposite ends of the retention portion.

10. The card connector as claimed in claim 9, wherein the housing further comprises a recess for receiving the detecting contact therein.

11. The card connector as claimed in claim 10, wherein the recess comprises a horizontal recess for receiving the contact portion of the detecting portion therein and a vertical recess for receiving the tail of the detecting portion therein.

12. The card connector as claimed in claim 11, wherein the vertical recess comprises an inner recess and an outer recess, the inner recess used for receiving the retention portion therein, the outer recess used for receiving the tail of the detecting contact.

13. A card connector comprising:

a housing comprising a receiving section for accepting a card therein and an ejecting mechanism receiving section having a slider;

a plurality of contacts received in the receiving section;

a cover mounted on the housing defining a cover contact a detecting contact including a retention portion, a tail member and a contact portion extending from the retention from two opposite ends of the retention portion;

wherein the housing further comprises a rotator attached to a locating post and biased by a spring member for moving rotatably and disposed within the ejecting mechanism receiving section and having a stopper in contact with a second section of the slider and a recess on a front wall thereof for receiving the detecting contact therein, the recess comprising a horizontal recess for receiving the contact portion therein and a vertical recess for partially receiving the detecting contact;

wherein the vertical recess comprises an inner recess and an outer recess, the inner recess used for receiving the retention portion therein, the outer recess used for receiving the tail of the detecting contact.

14. A card connector assembly comprising:

an insulative housing;

a plurality of contacts disposed in the housing;

a card receiving space defined above the housing;

an electronic card adapted to be inserted into or ejected from the card receiving space, said card defining a notch in a side edge;

an ejection mechanism associated with the housing and including:

a slider moveable relative to the housing along a lengthwise direction, said slider including a card engaging section and a card locking section;

a spring attached to a locating pin urging the slider forwardly;

an actuator installed on a locating post around a front portion of the housing to forcibly move essentially the whole slider sideward when said slider is moved to a front position so as to have the card locking section move sideward to release the card locking section from the notch;

wherein the actuator is moveable so as to assure the card locking section correctly latches the notch while also being urged by another spring to resume an original position which makes the slider move sideward to release the card locking section from the notch;

wherein said actuator is essentially a rotator and is moved in rotation.

15. The assembly as claimed in claim 14, wherein said slider is wholly tilted relative to the lengthwise direction when said slider is located in the front position.

* * * * *